(12) United States Patent
Yuan et al.

(10) Patent No.: US 9,531,700 B2
(45) Date of Patent: Dec. 27, 2016

(54) AUTHENTICATION SURVIVABILITY FOR ASSIGNING ROLE AND VLAN BASED ON CACHED RADIUS ATTRIBUTES

(71) Applicant: Aruba Networks, Inc., Sunnyvale, CA (US)

(72) Inventors: Liang-Chih Yuan, Sunnyvale, CA (US); Vikram Limaye, Bangalore (IN); Ashutosh Nasikkar, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 168 days.

(21) Appl. No.: 14/610,033

(22) Filed: Jan. 30, 2015

(65) Prior Publication Data

US 2016/0226848 A1    Aug. 4, 2016

(51) Int. Cl.
*G06F 21/30* (2013.01)
*H04L 29/06* (2006.01)

(52) U.S. Cl.
CPC ............. *H04L 63/08* (2013.01); *H04L 63/102* (2013.01)

(58) Field of Classification Search
CPC ................................ H04L 63/08; H04L 63/102
USPC .................................................. 726/1, 4, 7
See application file for complete search history.

(56) References Cited

U.S. PATENT DOCUMENTS

| | | | | |
|---|---|---|---|---|
| 7,447,166 | B1* | 11/2008 | Kaluve | H04L 12/66 370/254 |
| 7,735,114 | B2* | 6/2010 | Kwan | H04L 63/08 455/410 |
| 7,899,918 | B1* | 3/2011 | Potter | H04L 12/14 709/202 |
| 8,566,926 | B1* | 10/2013 | Schnellbacher | G06F 13/00 455/432.3 |
| 8,793,782 | B1* | 7/2014 | Su | H04L 63/0807 713/153 |
| 2010/0306829 | A1* | 12/2010 | Nishio | G06F 21/31 726/4 |
| 2014/0096214 | A1* | 4/2014 | Sheth | G06F 21/31 726/7 |
| 2016/0088475 | A1* | 3/2016 | Zhang | H04L 63/08 726/7 |

* cited by examiner

*Primary Examiner* — Sayed Beheshiti Shirazi
(74) *Attorney, Agent, or Firm* — Hewlett Packard Enterprise Patent Department (57) ABSTRACT

A system and method is described that allows the assignment of roles and/or VLANs to an authenticated client device even when an external remote authentication dial in user service (RADIUS) server is inaccessible. In particular, using RADIUS key-reply attributes stored locally after a previous successful authentication using the external RADIUS server, an internal RADIUS server may perform authentication and pass the stored RADIUS key-reply attributes to an authentication module for assignment of a role and/or VLAN to the client device. Accordingly, roles and/or VLANs may be assigned to enforce access privileges of the client device even when an external RADIUS server is inaccessible.

14 Claims, 3 Drawing Sheets

FIG. 3

AUTHENTICATION SURVIVABILITY FOR ASSIGNING ROLE AND VLAN BASED ON CACHED RADIUS ATTRIBUTES

TECHNICAL FIELD

The present disclosure relates to ensuring network access for client devices within a branch office network when an external remote authentication dial in user service (RADIUS) server is inaccessible by storing RADIUS attributes locally in the branch office network. By storing RADIUS attributes locally, roles and virtual local area networks (VLANs), which define access privileges, may be assigned to client devices even when the external RADIUS server is inaccessible.

BACKGROUND

Over the last decade, there has been a substantial increase in the use and deployment of networked client devices. For example, personal computers, tablet computers, and cellular telephones may communicate in accordance with one or more Institute of Electrical and Electronics Engineers (IEEE) standards. In some instances, these client devices may operate in one of a distributed set of branch offices.

To ensure a client device is authorized to gain access to network resources, an authentication procedure may be performed. The authentication procedure may involve client devices seeking approval from an external RADIUS server to operate within the network system. This approval may include RADIUS attributes provided by the external RADIUS server over a data connection to a local network controller or switch. These RADIUS attributes may be used to assign roles and VLANs, which define access privileges, to the client devices. Although this approach may provide an efficient, centralized technique for authenticating client devices and assigning roles and VLANs when the external RADIUS server is accessible, authentication may be halted and client devices may not be able to gain access to the network when the external RADIUS server is inaccessible.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Network System

Figure 1:
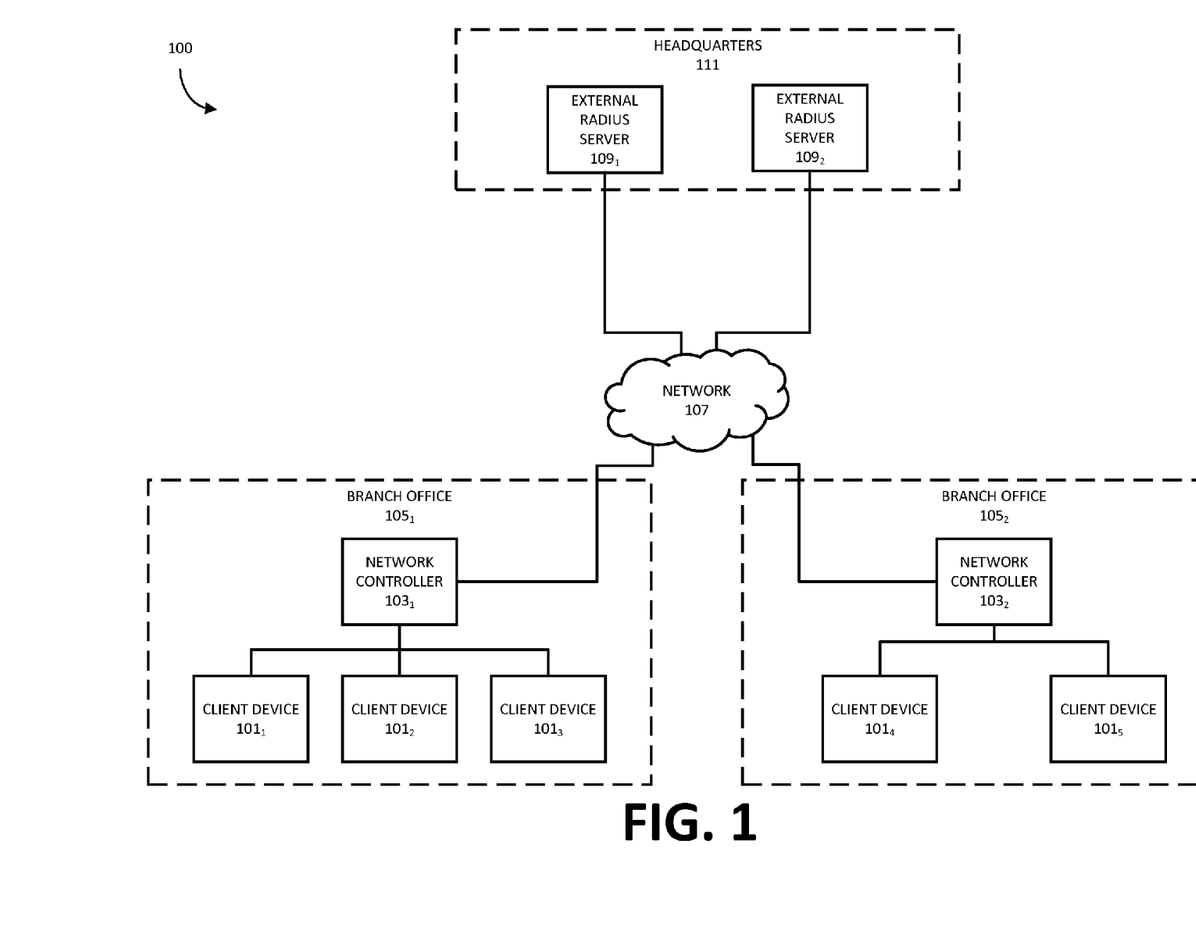
FIG. 1 shows a block diagram example of a network system in accordance with one or more embodiments.

FIG. 1 shows a block diagram example of a network system 100 in accordance with one or more embodiments. The network system 100, as illustrated in FIG. 1, is a digital system that may include a plurality of digital devices such as one or more client devices $101_1$-$101_5$ and one or more network controllers $103_1$ and $103_2$ that are operating in respective branch offices $105_1$ and $105_2$. The network controllers $103_1$ and $103_2$ may be connected to the client devices $101_1$-$101_5$ through respective wired and/or wireless connections. In one embodiment, the network controllers $103_1$ and $103_2$ control network access for the client devices $101_1$-$101_5$. For example, the network controllers $103_1$ and $103_2$ may facilitate authentication of the client devices $101_1$-$101_5$ via (1) an external remote authentication dial in user service (RADIUS) server $109_1$ or $109_2$ that is located at a remote headquarters 111 or (2) an internal RADIUS server provided by the network controllers $103_1$ and $103_2$. In particular, when the external RADIUS servers $109_1$ and $109_2$ are inaccessible, the network controllers $103_1$ and $103_2$ may provide an internal RADIUS server to authenticate/re-authenticate the client devices $101_1$-$101_5$ within the network system 100. This authentication/re-authentication may be based on RADIUS attributes received from the external RADIUS servers $109_1$ or $109_2$ during a previous successful authentication procedure. In one embodiment, as will be described in greater detail below, the RADIUS attributes may be used for assigning a role and/or a virtual local area network (VLAN) for a client device $101_1$-$101_5$. As will be described in greater detail below, these roles and VLANs define the access privileges of the client devices $101_1$-$101_5$ within the network system 100.

Each element of the network system 100 shown in FIG. 1 will now be described by way of example. In other embodiments, the network system 100 may include more elements than the items shown in FIG. 1. For example, each of the branch offices $105_1$ and $105_2$ may include additional networking devices, including switches, access points, and routers. Further, in some embodiments, the network system 100 may include more or less branch offices 105. Accordingly, the network system 100 of FIG. 1 is used for illustrative purposes and is not restrictive.

Each of the branch offices $105_1$ and $105_2$ may be installed in any region or area. For example, the network controller $103_1$ and the client devices $101_1$-$101_3$, which represent the branch office $105_1$, may be installed in an office building at a first location while the network controller $103_2$ and the client devices $101_4$ and $101_5$, which represent the branch office $105_2$, may be installed in an office building at a second location. Similarly, the external RADIUS servers $109_1$ and $109_2$, which represent the headquarters 111, may be installed in an office building at a third location. Each of the first, second, and third locations may be separated by any distance (e.g., 500 feet or 500 miles). Further, the devices at each of the branch offices $105_1$ and $105_2$ and the headquarters 111 may form respective local networks that are communicatively connected by the network 107. For example, the network controller $103_1$ and the client devices $101_1$-$101_3$ may form a first local network, the network controller $103_2$ and the client devices $101_4$ and $101_5$ may form a second local network, and the external RADIUS servers $109_1$ and $109_2$ may form a third local network. As noted above, each of these local networks may include more networking devices than those shown (e.g., switches, access points, and/or routers).

As described herein, the network system 100 may control access and privileges through the assignment of roles and/or VLANs. For example, roles may define network resources and levels of access available to assigned users and client devices 101, and VLANs may be segmented portions of the network that provide different levels of access to network resources. For instance, a user/client device 101 assigned to the role of "marketing" may be placed on a VLAN that only allows the user/client device 101 to make Hypertext Transfer Protocol (HTTP) requests and access a marketing server within the network system 100. In comparison, a user/client device 101 with an "administrator" role may be placed on a VLAN that provides unrestricted access to the network system 100.

Figure 2:
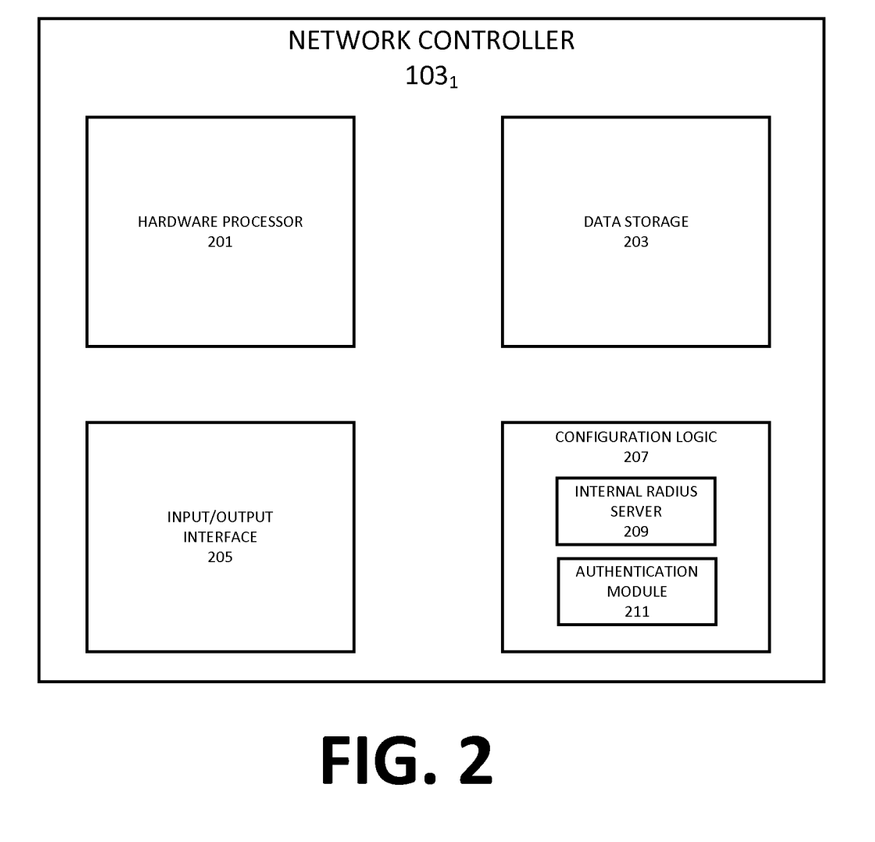
FIG. 2 shows a block diagram example of a network controller in accordance with one or more embodiments.

Turning now to FIG. 2, the network controller $103_1$ will be described by way of example. Although the network controller $103_1$ is described herein, the network controller $103_2$ may be similarly structured and configured. The network controller $103_1$ may be any device that can associate with the client devices $101_1$-$101_3$ to transmit and receive data over wired or wireless connections. As noted above, in some embodiments, the network controller $103_1$ may facilitate assignment of roles and VLANs to client devices $101_1$-$101_3$ based on (1) recently received RADIUS attributes from one of the external RADIUS servers $109_1$ and $109_2$ corresponding to a current authentication routine or (2) previously received and locally stored RADIUS attributes from one of the external RADIUS servers $109_1$ and $109_2$ corresponding to a previously performed authentication routine. FIG. 2 shows a component diagram of the network controller $103_1$ according to one embodiment. As noted above, the network controller $103_2$ may include similar or identical components to those shown and described in relation to the network controller $103_1$.

As shown in FIG. 2, the network controller $103_1$ may comprise one or more of: a hardware processor 201, data storage 203, an input/output (I/O) interface 205, and device configuration logic 207. Each of these components of the network controller $103_1$ will be described in further detail below.

The data storage 203 of the network controller $103_1$ may include a fast read-write memory for storing programs and data during performance of operations/tasks and a hierarchy of persistent memory, such as Read Only Memory (ROM), Erasable Programmable Read Only Memory (EPROM), and/or Flash memory for example, for storing instructions and data needed for the startup and/or operation of the network controller $103_1$. In one embodiment, the data storage 203 is a distributed set of data storage components. The data storage 203 may store data that is to be transmitted from the network controller $103_1$ or data that is received by the network controller $103_1$. In some embodiments, the data storage 203 may be used for storing client device 101 credentials and/or RADIUS attributes, which were received from an external RADIUS server $109_1$/$109_2$ during a previous successful authentication/re-authentication attempt. As noted above, these RADIUS attributes may be used for assigning roles and VLANs to corresponding client devices 101.

In one embodiment, the I/O interface 205 corresponds to one or more components used for communicating with other devices (e.g., the client devices $101_1$-$101_3$ and/or the external RADIUS servers $109_1$ and $109_2$) via wired or wireless signals. The I/O interface 205 may include a wired network interface such as an IEEE 802.3 Ethernet interface and/or a wireless interface such as an IEEE 802.11 WiFi interface. In one embodiment, the I/O interface 205 facilitates communications between the network controller $103_1$ and one or more of the external RADIUS servers $109_1$ and $109_2$ through the network 107. In one embodiment, the network 107 includes a set of network components that facilitate communications between multiple devices. For example, the network 107 may be composed of one or more switches, routers, hubs, etc. These network components that comprise the network 107 may operate using both wired and wireless mediums. In one embodiment, the network 107, or a portion of the network 107, may be the Internet.

In one embodiment, the hardware processor 201 is coupled to the data storage 203 and the I/O interface 205. The hardware processor 201 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 207 includes one or more functional units implemented using firmware, hardware, software, or a combination thereof for configuring parameters associated with the network controller $103_1$ and/or the client device $101_1$-$101_3$. In one embodiment, the device configuration logic 207 may be configured to perform authentication and/or to assign roles and VLANs to authenticated client devices $101_1$-$101_3$. For instance, the internal RADIUS server 209 may authenticate a client device 101 when the external RADIUS servers $109_1$ and $109_2$ are inaccessible or otherwise unavailable. As will be described in greater detail below, upon successfully authenticating a client device 101, the internal RADIUS server 209 may pass/transmit corresponding client device 101 RADIUS attributes stored locally within the network controller $103_1$ or stored locally elsewhere in the branch office $105_1$ to the authentication module 211. The RADIUS attributes may have been received from the external RADIUS servers $109_1$ or $109_2$ during a previous successful authentication of the client device 101. The authentication module 211 may use the locally stored RADIUS attributes to assign a role and/or VLAN to the client device 101.

Although shown and described as being implemented within the configuration logic 207, the internal RADIUS server 209 and the authentication module 211 may reside in any portion of the network controller $103_1$. For instance, in other embodiments, the internal RADIUS server 209 and/or the authentication module 211 may reside in the data storage 203.

As described above, the network controller $103_2$ may be similarly configured as described above in relation to the network controller $103_1$. For example, the network controller $103_2$ may comprise a hardware processor 201, data storage 203, an input/output (I/O) interface 205, and device configuration logic 207 in a similar fashion as described above in relation to the network controller $103_1$.

Although described as controllers, in other embodiments the network controllers $103_1$ and $103_2$ may be other types of networking devices. For example, in other embodiments one or more of the network controllers $103_1$ and $103_2$ may be network switches.

In one embodiment, the client devices $101_1$-$101_5$ may be any wireless or wired electronic devices capable of receiving and transmitting data over wired and wireless mediums. For example, the client devices $101_1$-$101_5$ may be one or more of personal computers, laptop computers, netbook computers, wireless music players, portable telephone communication devices, smart phones, tablets, and digital televisions. In one embodiment, the client devices $101_1$-$101_5$ are digital devices that include a hardware processor, memory hierarchy, and input/output (I/O) interfaces including a wired and/or wireless interface such as an IEEE 802.3 interface. In one embodiment, the configuration of the components within the client devices $101_1$-$101_5$ may be similar to those discussed above in relation to the network controller $103_1$. In other embodiments, the client devices $101_1$-$101_5$ may include more or less components than those shown in FIG. 2 in relation to the network controller $103_1$.

In one embodiment, the external RADIUS servers $109_1$ and $109_2$ are digital devices that include a hardware processor, memory hierarchy, and input/output (I/O) interfaces including a wired and/or wireless interface such as an IEEE 802.3 interface. In one embodiment, the configuration of the components within the external RADIUS servers $109_1$ and $109_2$ may be similar to those discussed above in relation to the network controller $103_1$. In other embodiments, the external RADIUS servers $109_1$ and $109_2$ may include more or less components than those shown in FIG. 2 in relation to the network controller $103_1$. Although shown with two external RADIUS servers $109_1$ and $109_2$, the network system 100 may similarly operate with a single external RADIUS server $109_1$. Accordingly, the use of multiple external RADIUS servers $109_1$ and $109_2$ may be for purposes of redundancy.

As will be discussed in greater detail below, when accessible, the external RADIUS servers $109_1$ and $109_2$ may authenticate one or more of the client devices $101_1$-$101_5$ to operate within the local network of the branch offices $105_1$ and $105_2$, respectively, and/or the network 107. In particular, the external RADIUS servers $109_1$ and $109_2$ may provide RADIUS attributes to the network controllers $103_1$ and $103_2$ in response to a successful authentication of a client device $101_1$-$101_5$. The RADIUS attributes may be used to assign roles and/or VLANs to the client devices $101_1$-$101_5$. These roles and VLANs define the access privileges of the client devices 101 within the network system 100. The network controllers $103_1$ and $103_2$ may store these RADIUS attributes for use during subsequent authentication/re-authentication procedures when the external RADIUS servers $109_1$ and $109_2$ are inaccessible. The process and procedure for storing and utilizing RADIUS attributes will be described in greater detail below by way of example.

Authentication of Client Devices

Figure 3:
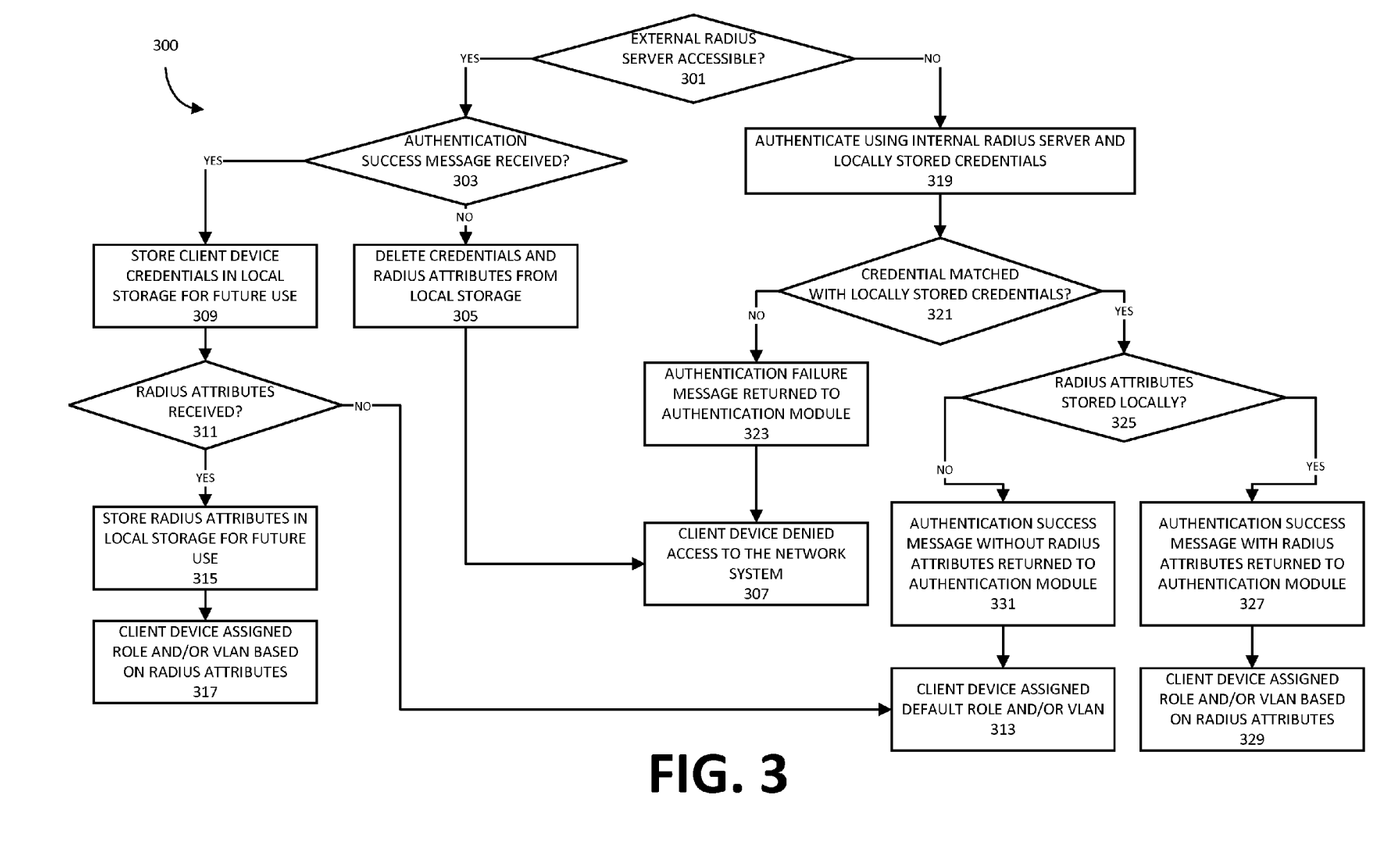
FIG. 3 shows a method according to one embodiment for authenticating and assigning a role and/or virtual local area network (VLAN) to a client device based on remote authentication dial in user service (RADIUS) attributes received directly from an external RADIUS server or RADIUS attributes received during a previous authentication and stored locally.

FIG. 3 shows a method 300 according to one embodiment for authenticating a client device 101 using RADIUS attributes received from one of the external RADIUS servers $109_1$ and $109_2$ during either a current authentication of the client device 101 or during a previous successful authentication of the client device 101. The method 300 may be performed by one or more devices in the network system 100. For example, the method 300 may be performed by one of the network controllers $103_1$ and $103_2$ in conjunction with one of the external RADIUS servers $109_1$ and $109_2$.

Although each of the operations in the method 300 are shown and described in a particular order, in other embodiments, the operations of the method 300 may be performed in a different order. For example, although the operations of the method 300 are shown as being performed sequentially, in other embodiments the operations of the method 300 may be performed concurrently or during partially overlapping time periods.

In the description that follows, the method 300 will be described in relation to the network controller $103_1$, the client device $101_1$, and the external RADIUS server $109_1$. However, it is understood that the method 300 may be similarly performed with other network controller 103, client device 101, and external RADIUS server 109 combinations that are communicatively connected.

In one embodiment, the method 300 may commence at operation 301 with the determination as to whether the external RADIUS server $109_1$ is accessible or inaccessible. Accessibility may be defined as the external RADIUS server $109_1$ receiving and responding to messages from the network controller $103_1$ and/or the client device $101_1$. The external RADIUS server $109_1$ may be inaccessible for a variety of reasons, including (1) the network 107 is down or otherwise not operating correctly; (2) the external RADIUS server $109_1$ is down or otherwise not operating correctly; and (3) the network controller $103_1$ is not operating correctly and is unable to access the network 107. In one embodiment, and as will be described herein, operation 301 may determine that the external RADIUS server $109_1$ is inaccessible after the network controller $103_1$ has transmitted one or more authentication request messages to the external RADIUS server $109_1$ on behalf of the client device $101_1$. For example, after the network controller $103_1$ has failed to receive an acknowledgement or response to an authentication request message after a predefined period of time and/or after a predefined number of retries, operation 301 may determine that the external RADIUS server $109_1$ is inaccessible. Conversely, upon receiving a response from the external RADIUS server $109_1$ (e.g., an acknowledgment message, an authentication success message, or an authentication failure message), operation 301 may determine that the external RADIUS server $109_1$ is accessible. In one embodiment, operation 301 may be performed by the authentication module 211 of the network controller $103_1$.

Upon determining that the external RADIUS server $109_1$ is accessible at operation 301, operation 303 may determine whether an authentication success or an authentication failure message was received from the external RADIUS server $109_1$. In particular, as noted above in relation to operation 301, the network controller $103_1$ may have transmitted an authentication request message for the client device $101_1$ to the external RADIUS server $109_1$. The authentication request message may include credentials for the client device $101_1$ (e.g., a user name and password for a user of the client device $101_1$). In response to receipt of this authentication request message, the external RADIUS server $109_1$ may determine whether the client device $101_1$ is authorized to access the network system 100. For example, the external RADIUS server $109_1$ may compare the credentials received in the authentication request message with a set of authorized credentials. In response to locating a match between the credentials of the client device $101_1$ and a set of authorized credentials, the external RADIUS server $109_1$ may generate and transmit an authentication success message to the network controller $103_1$. Conversely, in response to failing to locate a match between the credentials of the client device $101_1$ and a set of authorized credentials, the external RADIUS server $109_1$ may generate and transmit an authentication failure message to the network controller $103_1$. At operation 303, the method 300 may determine whether an authentication success or an authentication failure message was received from the external RADIUS server $109_1$. In one embodiment, operation 303 may be performed by the authentication module 211 of the network controller $103_1$.

Upon receiving an authentication failure message from the external RADIUS server $109_1$, operation 305 may delete all credentials and RADIUS attributes for the unauthorized client device $101_1$ that are stored locally on the network controller $103_1$ and/or locally on the local network of the branch office $105_1$ where the client device $101_1$ and the network controller $103_1$ reside. As noted above, the client device $101_1$ credentials may correspond to a user name and password for a user of the client device $101_1$. In contrast, the RADIUS attributes are data values that indicate a role and/or a VLAN with which the client device $101_1$ would be associated with if authentication were successful. As will be described in greater detail below, the RADIUS attributes may have been received from the external RADIUS server $109_1$ and stored locally by the network controller $103_1$ during a previous successful authentication of the client device $101_1$ using the external RADIUS server $109_1$. In one embodiment, operation 305 may be performed by the internal RADIUS server 209 and/or the authentication module 211 of the network controller $103_1$.

Following deletion of locally stored client device $101_1$ credentials and RADIUS attributes, operation 307 may deny the client device $101_1$ access to the network system 100. This denial may be carried out through a failure of the network controller $103_1$ to assign a role or VLAN to the client device $101_1$. In one embodiment, operation 307 may be performed by the authentication module 211 of the network controller $103_1$.

Returning to operation 303, upon receiving an authentication success message for the client device $101_1$, the method 300 may move to operation 309. At operation 309, the credentials of the client device $101_1$ may be stored locally on the network controller $103_1$ or at a different location within the local network of the branch office $105_1$. For example, the credentials of the successfully authenticated client device $101_1$ may be stored in the data storage 203 of the network controller $103_1$ at operation 309. Storing the client device $101_1$ credentials locally ensures that a subsequent authentication may be performed by the network controller $103_1$ when the external RADIUS server $109_1$ is inaccessible. In one embodiment, operation 309 may be performed by the internal RADIUS server 209 and/or the authentication module 211 of the network controller $103_1$.

Following storage of the client device $101_1$ credentials, operation 311 may determine if RADIUS attributes have been received from the external RADIUS server $109_1$ during the current authentication procedure. In one embodiment, the RADIUS attributes may be passed to the network controller $103_1$ within the authentication success message. For example, Table 1 below shows a set of credentials (e.g., user names and passwords) along with RADIUS attributes and RADIUS attribute values that may be transmitted along with the authentication success message. Table 1 is an example of data, including user credentials (e.g., user names and passwords) and RADIUS attribute names and values, stored locally with the network controller $103_1$. The credential data may be stored at operation 309 and the RADIUS attribute data may be stored at operation 315.

TABLE 1

| Username | Password | Attribute Name | Attribute Value |
|---|---|---|---|
| User1 | XXXXX | A_Role | Finance |
| User1 | XXXX | A_Vlan | 10 |
| User2 | XXXXX | A_Role | Marketing |
| User2 | XXXX | A_Vlan | 20 |
| User3 | XXXX | MS_TUNNEL_TYPE | VLAN (13) |
|  |  | MS_TUNNEL_MEDIUM_TYPE | IEEE-802 (6) |
|  |  | MS_TUNNEL_PRIVATE_GROUP_ID | 30 |
| User4 | XXXX |  |  |

As shown in Table 1, various numbers and types of RADIUS attributes may be transmitted in the authentication success message. In some instances, no RADIUS attributes may be transmitted in the authentication success message as shown in Table 1 in relation to User4.

In response to determining at operation 311 that no RADIUS attributes were received from the external RADIUS server $109_1$, the method 300 may move to operation 313. At operation 313, the client device $101_1$ may be assigned a default role and/or VLAN in the network system 100. For example, the default role and/or VLAN may restrict the client device $101_1$ to a small segment of network resources (e.g., only access to the World Wide Web). The default role and VLAN may be preset by an administrator of the network system 100.

Conversely, in response to determining at operation 311 that RADIUS attributes were received from the external RADIUS server $109_1$, the method 300 may move to operation 315. At operation 315, the RADIUS attributes may be stored locally within the network controller $103_1$ or otherwise locally within the local network of the branch office $105_1$ where the network controller $103_1$ and the client device $101_1$ reside. For example, the RADIUS attributes of the successfully authenticated client device $101_1$ may be stored in the data storage 203 of the network controller $103_1$ at operation 315. Storing the client device $101_1$ RADIUS attributes locally ensures that a subsequent assignment of role and VLAN may be performed by the network controller $103_1$ when the external RADIUS server $109_1$ is inaccessible.

In some embodiments, all the RADIUS attributes may not be able to be stored locally within the network controller $103_1$ and/or within the local network of the branch office $105_1$. For instance, the data storage 203 of the network controller $103_1$ may be limited in size and cannot hold all the RADIUS attributes of each of the client devices 101 within the local network of the branch office $105_1$. Accordingly, in these embodiments, a subset of the RADIUS attributes may be selected at operation 315 for storage. In particular, operation 315 may select those RADIUS attributes needed for assigning a role and/or VLAN to the authenticated client device $101_1$. This subset of RADIUS attributes may be termed RADIUS key-reply attributes and can be divided into two parts: (1) hard coded implementation attributes and (2) attributes configured for each network controller 103 or switch at run time. When RADIUS attributes are detected at operation 311, only those attributes that match the predefined RADIUS key-reply attributes are stored at operation 315 to ensure efficient usage of storage resources. In one embodiment, operations 311, 313, and 315 may be performed by the authentication module 211 of the network controller 103$_1$.

Following storage of RADIUS key-reply attributes, operation 317 may assign a role and/or VLAN to the client device 101$_1$ based on the RADIUS key-reply attributes. For example, the authentication module 211 of the network controller 103$_1$ may assign a role and/or a VLAN by directly examining the RADIUS key-reply attributes or by applying configured Server Derivation Rules using the RADIUS key-reply attributes. Table 2 shows the role and VLAN assignments based on the RADIUS attributes shown in Table 1.

TABLE 2

| Username | Password | Attribute Name | Attribute Value | Assignment |
|---|---|---|---|---|
| User1 | XXXXX | A_Role | Finance | Role = Finance |
| User1 | XXXX | A_Vlan | 10 | Vlan = 10 |
| User2 | XXXXX | A_Role | Marketing | Role = Finance |
| User2 | XXXX | A_Vlan | 20 | Vlan = 20 |
| User3 | XXXX | MS_TUNNEL_TYPE | VLAN (13) | Role = Default |
|  |  | MS_TUNNEL_MEDIUM_TYPE | IEEE-802 (6) | Vlan = 30 |
|  |  | MS_TUNNEL_PRIVATE_GROUP_ID | 30 |  |
| User4 | XXXX |  |  | Role = Default |
|  |  |  |  | VLAN = Default |

As shown above, each of User1-User4 is assigned a role and VLAN based on respective attribute values. Of particular note, although User3 includes VLAN specific RADIUS key-reply attributes that are used to assign a VLAN, the lack of role based RADIUS key-reply attributes results in the client device 101 corresponding to the User3 being assigned a default role and a RADIUS key-reply attribute specific VLAN. Similarly, the User4 lacks any RADIUS key-reply attributes. Accordingly, the client device 101 corresponding to the User4 is assigned both default role and VLAN values.

As described above, the client device 101$_1$ is authenticated using the external RADIUS server 109$_1$. However, in some instances the external RADIUS server 109$_1$ may be inaccessible. As noted above, this inaccessibility may be for a variety of reasons, including (1) the network 107 being down or otherwise not operating correctly; (2) the external RADIUS server 109$_1$ being down or otherwise not operating correctly; and (3) the network controller 103$_1$ is not operating correctly and is unable to access the network 107. In these situations, the method 300 may rely on an internal RADIUS server 209 within the network controller 103$_1$ to perform authentication and to pass stored RADIUS key-reply attributes to the authentication module 211 of the network controller 103$_1$ to assign a role and/or VLAN.

In particular, returning to operation 301, upon determining that the RADIUS server 109$_1$ is inaccessible, the method 300 may move to operation 319. At operation 319, the internal RADIUS server 209 of the network controller 103$_1$ may perform authentication of the client device 101$_1$ within the network system 100. Similar to authentication with the external RADIUS server 109$_1$, authentication with the internal RADIUS server may involve comparing credentials of the client device 101$_1$ with a set of authorized credentials. In response to locating a match between the credentials of the client device 101$_1$ and a set of authorized credentials, the internal RADIUS server 209 may determine that authentication was successful. Conversely, in response to failing to locate a match between the credentials of the client device 101$_1$ and a set of authorized credentials, the internal RADIUS server 209 may determine that authentication was unsuccessful.

At operation 321, the method 300 may determine whether credentials associated with a user of the client device 101$_1$ match with credentials stored locally. Upon operation 321 determining that credentials associated with a user of the client device 101$_1$ match with locally stored credentials, an authentication failure message may be generated and transmitted/passed from the internal RADIUS server 209 to the authentication module 211 of the network controller 103$_1$ at operation 323. In response to this authentication failure message, the authentication module 211 may deny the client device 101$_1$ access to the network system 100 at operation 307.

Conversely, upon determining that there was not a match of credentials at operation 321, the method 300 may move to operation 325 to determine if RADIUS attributes, and in particular RADIUS key-reply attributes, are locally stored within the network controller 103$_1$ and/or within the local network of the branch office 105$_1$. As noted above in relation to operation 315, upon a previous successful authentication of the client device 101$_1$ by the external RADIUS server 109$_1$, RADIUS key-reply attributes may be stored locally within the data storage 203 of the network controller 103$_1$ or elsewhere in the local network of the branch office 105$_1$, where the client device 101$_1$ and the network controller 103$_1$ reside. These locally stored RADIUS key-reply attributes may now be used by the authentication module 211 to assign a role and/or VLAN to the client device 101$_1$.

Upon detection of locally stored RADIUS key-reply attributes for the client device 101$_1$, operation 327 may generate an authentication success message with the locally stored RADIUS key-reply attributes. Operation 327 may further transmit/pass this authentication success message along with the RADIUS key-reply attributes to the authentication module 211 of the network controller 103$_1$. The authentication module 211 may assign a role and/or VLAN to the authenticated client device 101$_1$ at operation 329 based on these RADIUS key-reply attributes, which were locally stored after a previous authentication using the external RADIUS server 109$_1$. In some embodiments, operation 329 may be similar or identical to operation 317, which was discussed above.

Upon failing to detect locally stored RADIUS key-reply attributes for the client device 101$_1$, operation 331 may generate an authentication success message without any RADIUS attributes and transmit/pass this authentication success message along to the authentication module 211 of the network controller $103_1$. Since the authentication success message lacks any RADIUS attributes, the authentication module 211 may assign a default role and/or VLAN to the authenticated client device $101_1$ at operation 313. For example, the default role and/or VLAN may restrict the client device $101_1$ to a small segment of network resources (e.g., only access to the World Wide Web). The default role and VLAN may be preset by an administrator of the network system 100.

As described above, the method 300 allows the assignment of roles and/or VLANs to an authenticated client device $101_1$ even when an external RADIUS server $109_1$ is inaccessible. In particular, using RADIUS key-reply attributes stored locally after a previous successful authentication using the external RADIUS server $109_1$, an internal RADIUS server 209 may perform authentication and pass the stored RADIUS key-reply attributes to an authentication module 211 for assignment of a role and/or VLAN. Accordingly, roles and VLANs may be assigned to enforce access privileges of the client device $101_1$ even when an external RADIUS server $109_1$ is inaccessible.

Herein, certain terminology is used to describe features for embodiments of the disclosure. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

The term "logic" (or "logic unit") may refer to any combination of hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be, for example, one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception will occur only when a combination of elements, functions, steps or acts are in some way inherently mutually exclusive.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages is applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for authenticating a client device in a network system, comprising:
    receiving, by an authentication module implemented by one or more hardware processors of a network controller within a local network of the network system, an authentication success message from an external remote authentication dial in user service (RADIUS) server located external to the local network;
    storing RADIUS attributes from the authentication success message when the authentication success message includes RADIUS attributes for the client device and;
    determining, at a later time by the network controller, whether the external RADIUS server, is accessible; and
    in response to determining that the external RADIUS server is inaccessible, an internal RADIUS server of the network controller:
        attempting to authenticate the client device within the local network based on credentials of the client device, and
        in response to successfully authenticating the client device, attempting to locate the RADIUS attributes stored locally within the local network; and
    in response to locating the locally stored RADIUS attributes, the authentication module assigning a role or virtual local area network (VLAN) to the client device based on the locally stored RADIUS attributes,
    in response to the authentication success message failing to include RADIUS attributes, assigning, by the authentication module, a default role or a default VLAN to the client device.

2. The method of claim 1, wherein only a subset of the RADIUS attributes are stored, the subset consisting of the RADIUS attributes indicating a role or a VLAN to be used by the client device upon being successfully authenticated, wherein the role or VLAN defines the access privileges of the client device within the network system.

3. The method of claim 1, further comprising:
receiving, by the authentication module of the network controller, an authentication failure message from the external RADIUS server when the external RADIUS server is accessible;
deleting credentials of the client device and RADIUS attributes of the client device stored locally in the local network; and
denying access for the client device in the network system.

4. The method of claim 1, further comprising:
in response to failing to locate locally stored RADIUS attributes, assigning a default role or a default VLAN to the client device.

5. The method of claim 1, further comprising:
in response to failing to authenticate the client device using the credentials of the client device, denying the client device access to the network system.

6. The method of claim 1, wherein the RADIUS attributes directly indicate a role or VLAN for the client device or a role or VLAN is determined for the client device by applying derivation rules to the RADIUS attributes.

7. A network controller for authenticating a client device in a network system, wherein the network controller and the client device are within a first network of the network system, the network controller comprising:
one or more hardware processors implementing:
an authentication module to:
receive an authentication success message from an external remote authentication dial in user service (RADIUS) server located in a second network of the network system;
store RADIUS attributes from the authentication success message when the authentication success message includes RADIUS attributes for the client device;
an internal RADIUS server, wherein the internal RADIUS server:
determines whether the external RADIUS server is accessible,
in response to determining that the external RADIUS server is inaccessible, attempts to authenticate the client device within the local network based on credentials of the client device, and
in response to successfully authenticating the client device, attempts to locate RADIUS attributes stored locally within the local network; and
wherein in response to locating the locally stored RADIUS attributes, the authentication module is to assign a role or virtual local area network (VLAN) to the client device based on the locally stored RADIUS attributes,
wherein in response to the authentication success message failing to include RADIUS attributes, assigning, by the authentication module, a default role or a default VLAN to the client device.

8. The network controller of claim 7, wherein only a subset of the RADIUS attributes are stored, the subset consisting of the RADIUS attributes indicating a role or a VLAN to be used by the client device upon being successfully authenticated.

9. The network controller of claim 7, wherein:
the authentication module processes an authentication failure message received from the external RADIUS server when the external RADIUS server is accessible;
the authentication module deletes credentials of the client device and RADIUS attributes of the client device stored locally in the first network; and
the authentication module denies access for the client device in the network system.

10. The network controller of claim 7, wherein:
in response to failing to locate locally stored RADIUS attributes, the authentication module assigns a default role or a default VLAN to the client device.

11. The network controller of claim 7, wherein:
in response to failing to authenticate the client device using the credentials of the client device, the authentication module denies the client device access to the network system.

12. The network controller of claim 7, wherein the RADIUS attributes directly indicate a role or VLAN for the client device or a role or VLAN is determined for the client device by applying derivation rules to the RADIUS attributes.

13. A non-transitory computer readable medium comprising instructions which, when executed by one or more hardware processors of a network device, cause the network device to:
receive an authentication success message from an external remote authentication dial in user service (RADIUS) server located outside a local network in which the network device and a client device are located;
store RADIUS attributes from the authentication success message when the authentication success message includes RADIUS attributes for the client device;
determine whether the external RADIUS server is accessible; and
in response to determining that the external RADIUS server is inaccessible, an internal RADIUS server of the network device to:
attempt to authenticate the client device within the local network based on credentials of the client device, and
in response to successfully authenticating the client device, attempt to locate RADIUS attributes stored locally within the local network; and
in response to locating the locally stored RADIUS attributes, assigning a role or virtual local area network (VLAN) to the client device based on the locally stored RADIUS attributes,
wherein in response to the authentication success message failing to include RADIUS attributes assigning a default role or a default VLAN to the client device.

14. The non-transitory computer readable medium of claim 13, wherein only a subset of the RADIUS attributes are stored, the subset consisting of the RADIUS attributes indicating a role or a VLAN to be used by the client device upon being successfully authenticated.

* * * * *